United States Patent [19]

Jarriel

[11] Patent Number: 5,996,012
[45] Date of Patent: Nov. 30, 1999

[54] APPLICATION DEVELOPMENT PROCESS FOR USE IN A DISTRIBUTED COMPUTER ENTERPRISE ENVIRONMENT

[75] Inventor: Stuart L. Jarriel, Austin, Tex.

[73] Assignee: International Business Machines Corporation, Armonk, N.Y.

[21] Appl. No.: 08/762,912

[22] Filed: Dec. 10, 1996

[51] Int. Cl.$^6$ .............................. G06F 13/38; G06F 15/17
[52] U.S. Cl. ............................................ 709/226; 709/223
[58] Field of Search ........................... 395/200.33, 200.5, 395/200.58, 200.31, 200.92, 200.56, 683, 671

[56] References Cited

U.S. PATENT DOCUMENTS

| | | | |
|---|---|---|---|
| 5,165,018 | 11/1992 | Simor | 395/200.52 |
| 5,307,499 | 4/1994 | Yin . | |
| 5,457,797 | 10/1995 | Butterworth et al. . | |
| 5,459,869 | 10/1995 | Fong . | |
| 5,463,769 | 10/1995 | Tate et al. . | |
| 5,475,819 | 12/1995 | Miller et al. | 395/200.33 |
| 5,606,693 | 2/1997 | Nilsen et al. | 707/10 |
| 5,684,955 | 11/1997 | Meyer et al. | 395/200.31 |

*Primary Examiner*—Mark H. Reiinehart

*Attorney, Agent, or Firm*—Jeffrey S. LaBaw; David H. Judson

[57] ABSTRACT

An application "builder" generates a configuration management application for use in a distributed computing environment having at least one management server and at least one endpoint. The endpoint includes a set of endpoint data to be managed by the application. The application developer begins by creating application prototyping data for the particular management application. The application prototyping data is then imprinted on a "blank" profile object to generate a prototype application comprising a profile object and an associated database whose records contain configuration information to be applied to at least one endpoint object. After the prototype application is generated, control information derived from the prototyping data is passed from the profile object to the endpoint object to read/write the endpoint data to/from the database records and/or to modify the database records in some way. As a result of such evaluation, the application developer can test how the prototype will operate because the testing is carried out with the actual endpoint data. Thereafter, the application prototyping data is refined as necessary and the process is repeated until the prototype is adequately tested. When the application prototype data is finalized, it is again applied to the profile to generate a final profile object, which is then used to drive a source code generator to create the application.

19 Claims, 6 Drawing Sheets

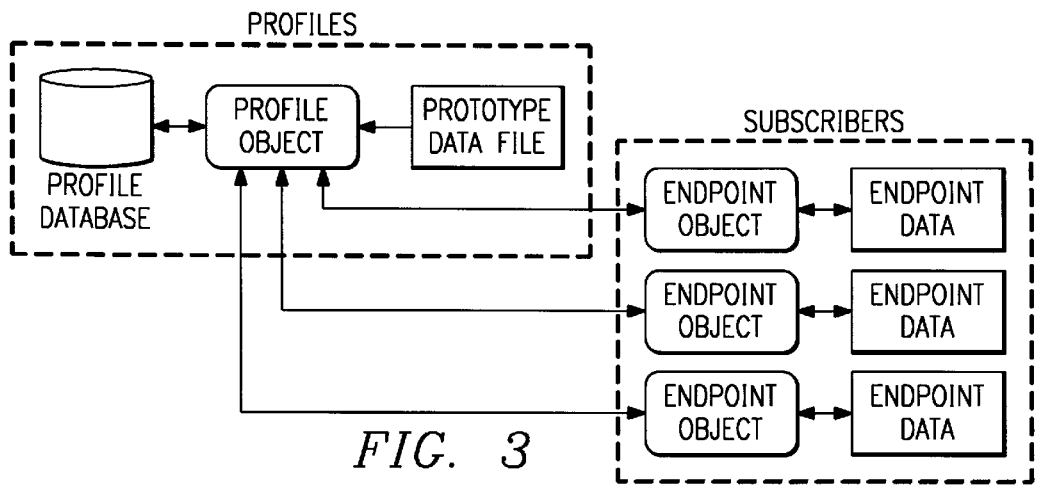

FIG. 3

```

DATAFILE:/etc/hosts
APP_RC:.host

ATTR:cname:1:15:four:150:1:0:1
ATTR:addr:1:16:four:150:1:0:1
ATTR:domain:0:20:four:150:1:1:1
ATTR:aliases:1:25:four:150:1:1:1
ATTR:comment:0:15:four:150:1:0:0
ATTR:mx:0:15:four:150:1:1:1
ATTR:txt:0:15:four:150:1:1:1
ATTR:hinfo:1:15:four:150:1:1:1

KEY_ATTR:cname,addr

SYNTAX:four:0:addr:^\d+\.\d+\.\d+\.\d+$
SYNTAX:four:0:cname: ^\W+$

# Parse entries
# Parse entries span 2 lines
# PARSE:regexp
# PARSE:attr1,attr2,attr3,attr4

# Each line pair is loaded into a single parse entry
PARSE:^(\d+\S*)\s+(\S+)\s+(\S+[\S+\s]*)\S*#*)\s*#\s*(\S+[\s*\S]*)
PARSE:addr,cname,aliases,comment
PARSE:^(\d+\S*)\s+(\S+)\s+(\S+[\s+\S]*)
PARSE:addr,cname,aliases
PARSE:^(\d+\S*)\s+(\S+)
PARSE:addr,cname
```

Sample PDF (Line Numbers added for reference)
1: DATAFILE:/etc/passwd
2: ATTR:login:1:10:1:0:1
3: ATTR:passwd:0:16:I:1:1
4: ATTR:uid:1:5:2:1:1
5: ATTR:gid:1:5:2:1:1
6: ATTR:gcos:1:20:1:1:0
7: ATTR:homedir:1:25:1:1:1
8: ATTR:shell:1:14:1:1:1
9: KEY_ATTR:login,uid
10: SYNTAX:uid:^\d+
11: SYNTAX:gid:^\d+
12: PARSE:(\S+):(\S*):(\d+):(\d+):(\S*):(\S*)
13: PARSE:login,passwd,uid,gid,gcos,homedir,shell

| login | passwd | uid | gid | gcos | homedir | shell |
|---|---|---|---|---|---|---|
| root | 0jj9AFxPizc4w | 0 | 3 | | / | /sbin/sh |
| bin | | 2 | 2 | | /usr/bin | /sbin/sh |
| adm | | 4 | 4 | | /var/adm | /sbin/sh |
| lp | | 9 | 7 | | /var/spool/lp | /sbin/sh |
| notes | | 150 | 30 | Notes Admin | /extra/notes | /bin/sh |

*FIG. 7*

| login | passwd | uid | gid | gcos | homedir | shell |
|---|---|---|---|---|---|---|
| | | | | | | |

*FIG. 8*

| login | passwd | uid | gid | gcos | homedir | shell |
|---|---|---|---|---|---|---|
| root | 0jj9AFxPizc4w | 0 | 3 | | / | /sbin/sh |
| bin | | 2 | 2 | | /usr/bin | /sbin/sh |
| adm | | 4 | 4 | | /var/adm | /sbin/sh |
| lp | | 9 | 7 | | /var/spool/lp | /sbin/sh |
| notes | | 150 | 30 | Notes Admin | /extra/notes | /bin/sh |

*FIG. 9*

| login | passwd | uid | gid | gcos | homedir | shell |
|---|---|---|---|---|---|---|
| root | 0jj9AFxPizc4w | 0 | 3 | | / | /sbin/sh |
| bin | | 2 | 2 | | /usr/bin | /sbin/csh |
| adm | | 4 | 4 | | /var/adm | /sbin/sh |
| lp | | 9 | 7 | | /var/spool/lp | /sbin/sh |
| notes | | 150 | 30 | Notes Admin | /extra/notes | /bin/sh |
| bob | | 220 | 50 | Bob User | /home/bob | /bin/sh |

*FIG. 10*

| login | passwd | uid | gid | gcos | homedir | shell |
|---|---|---|---|---|---|---|
| root | 0jj9AFxPizc4w | 0 | 3 | | / | /sbin/sh |
| bin | | 2 | 2 | | /usr/bin | /sbin/csh |
| adm | | 4 | 4 | | /var/adm | /sbin/sh |
| lp | | 9 | 7 | | /var/spool/lp | /sbin/sh |
| notes | | 150 | 30 | Notes Admin | /extra/notes | /bin/sh |
| bob | * | 220 | 50 | Bob User | /home/bob | /bin/sh |

*FIG. 11*

| login | passwd | uid | gid | gcos | homedir | shell |
|---|---|---|---|---|---|---|
| root | 0jj9AFxPizc4w | 0 | 3 | | / | /sbin/sh |
| bin | | 2 | 2 | | /usr/bin | /sbin/sh |
| adm | | 4 | 4 | | /var/adm | /sbin/sh |
| lp | | 9 | 7 | | /var/spool/lp | /sbin/sh |
| notes | | 150 | 30 | Notes Admin | /extra/notes | /bin/sh |
| bob | * | 220 | 50 | Bob User | /home/bob | /bin/sh |
| jane | * | 210 | 40 | Jane User | /home/jane | /bin/ksh |

*FIG. 12*

| login | passwd | uid | gid | gcos | homedir | shell |
|---|---|---|---|---|---|---|
| root | 0jj9AFxPizc4w | 0 | 3 | | / | /sbin/sh |
| bin | | 2 | 2 | | /usr/bin | /sbin/sh |
| adm | | 4 | 4 | | /var/adm | /sbin/sh |
| lp | | 9 | 7 | | /var/spool/lp | /sbin/sh |
| notes | | 150 | 30 | Notes Admin | /extra/notes | /bin/sh |
| bob | * | 220 | 50 | Bob User | /home/bob | /bin/sh |
| jane | * | 210 | 40 | Jane User | /home/jane | /bin/ksh |

*FIG. 13*

APPLICATION DEVELOPMENT PROCESS FOR USE IN A DISTRIBUTED COMPUTER ENTERPRISE ENVIRONMENT

TECHNICAL FIELD

The present invention is directed to rapid prototyping and development of configuration management applications for use in a large distributed computer enterprise environment.

BACKGROUND OF THE INVENTION

It is known in the prior art to provide a distributed computer environment comprising up to thousands of "nodes." Typically, the nodes are geographically dispersed and the overall environment is "managed" in a distributed manner. Often, the managed environment is broken down logically into a series of loosely-connected managed regions, each with its own management server for managing local resources. The management servers coordinate activities across the enterprise and permit remote site management and operation. In one particularly advantageous environment, known as a Tivoli managed environment, each management server serves a number of gateway machines, each of which in turn support a plurality of "endpoints." An important advantage of such distributed enterprise computing environments is that a system administrator may perform distributed configuration management tasks that affect all machines in the enterprise. As a consequence, it is an important goal of system providers to create distributed configuration management applications that are useful in such enterprises. Such applications could be used for many purposes, e.g., to manage users and groups, to keep endpoint configurations synchronized, to detect and resolve conflicts between endpoint configurations, to provide printer or file system configuration management, and the like. To date, however, there has been no efficient method for enabling application developers to quickly prototype, test, preview, code and modify distributed configuration management applications.

The present invention solves this important problem.

BRIEF SUMMARY OF THE INVENTION

It is a primary object of the invention to automate the development of distributed configuration management applications.

It is another primary object of the invention to speed the development and improve the quality and consistency of configuration management applications designed for use in a large, distributed enterprise environment.

It is still another important object of the invention to facilitate object-oriented prototyping of configuration management applications.

It is yet another important object to create abstract, architecture- and platform-independent profiles that describe configuration settings for the resources and services they manage.

It is a more general object to assist programmers to build distributed applications that are useful in controlling the configuration of many computer systems in a distributed computer enterprise environment.

It is a more particular object of the invention to use a given data set of application prototyping data to produce a prototype application, which is then tested and evaluated using the actual endpoint data to be managed by the finished application. The application prototyping data can be refined based on feedback from the prototype until the prototype is considered acceptable.

It is thus a more general object of the invention to provide a rapid prototyping tool and application development toolkit especially for use in building configuration management applications for a large distributed computer environment.

These and other objects are provided in a novel method of developing a configuration management application for use in a distributed computing environment. The distributed computing environment includes a management server and at least one endpoint, the endpoint having a set of endpoint data to be managed by the finished application. The method begins by using application prototyping data to generate a prototype application. The prototype application comprises a profile object and an associated database of records containing configuration information to be applied to an endpoint object representative of the at least one endpoint. Thereafter, the control information is passed from the profile object to the endpoint object to "apply" the endpoint data to the database records. This step enables the application developer to test and thereby evaluate the prototype using the actual set of endpoint data that will be managed by the finished product. As a result of the evaluation, the application prototyping data is refined as necessary and then used to generate a profile application comprising a modified profile object. That object is then used to drive a source code generator for creating the finished application.

According to a more specific embodiment, the application developer begins the process of generating a configuration management application by creating the application prototyping data in a standardized format. The application prototyping data is then imprinted on a "blank" profile object to generate a profile object. The profile object and certain list programmable endpoint code is then used to form a prototype application. As noted above, the profile object has an associated database whose records contain configuration information to be applied to an endpoint object that represents the endpoint to be managed. These records are derivable from the application prototyping data used to create the profile object. After the prototype application is generated, control information derived from the prototyping data is then passed from the profile object to the endpoint object to read/write the set of endpoint data to/from the database records. The control information may also be used to add, modify, delete, move, copy or timestamp records in the database. Based on the evaluation, the application prototyping data is refined as necessary and the process is repeated until the prototype is adequately tested by the application developer. When the application prototype data is finalized, it is again applied to the profile to generate the source code for the application, which will have the exact behavior of the prototype. The source code also includes skeletal endpoint code for the actual endpoint that will manage the endpoint data.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 3 is a more detailed representation of the relationship between a given profile and a set of subscribing endpoints;

FIGS. 4–5 are representative application prototyping data files;

FIG. 7 illustrates an Endpoint Database ED configured according to the/etc/passwd PDF shown in FIG. 4;

FIG. 8 illustrates a Profile Database PD prior to a profile operation involving the ED of FIG. 7;

FIG. 9 illustrates the Profile Database PD of FIG. 8 after the user performs a Populate operation;

FIG. 10 illustrates the Profile Database PD of FIG. 9 after the user performs an Add record operation and a Change record operation;

FIG. 11 illustrates the Endpoint Database ED after the user performs a Distribute operation;

FIG. 12 illustrates the Endpoint Database ED after an administrator adds a new record; and FIG. 13 illustrates the Profile Database PD after the user performs a Synchronize operation.

DETAILED DESCRIPTION

Figure 1:
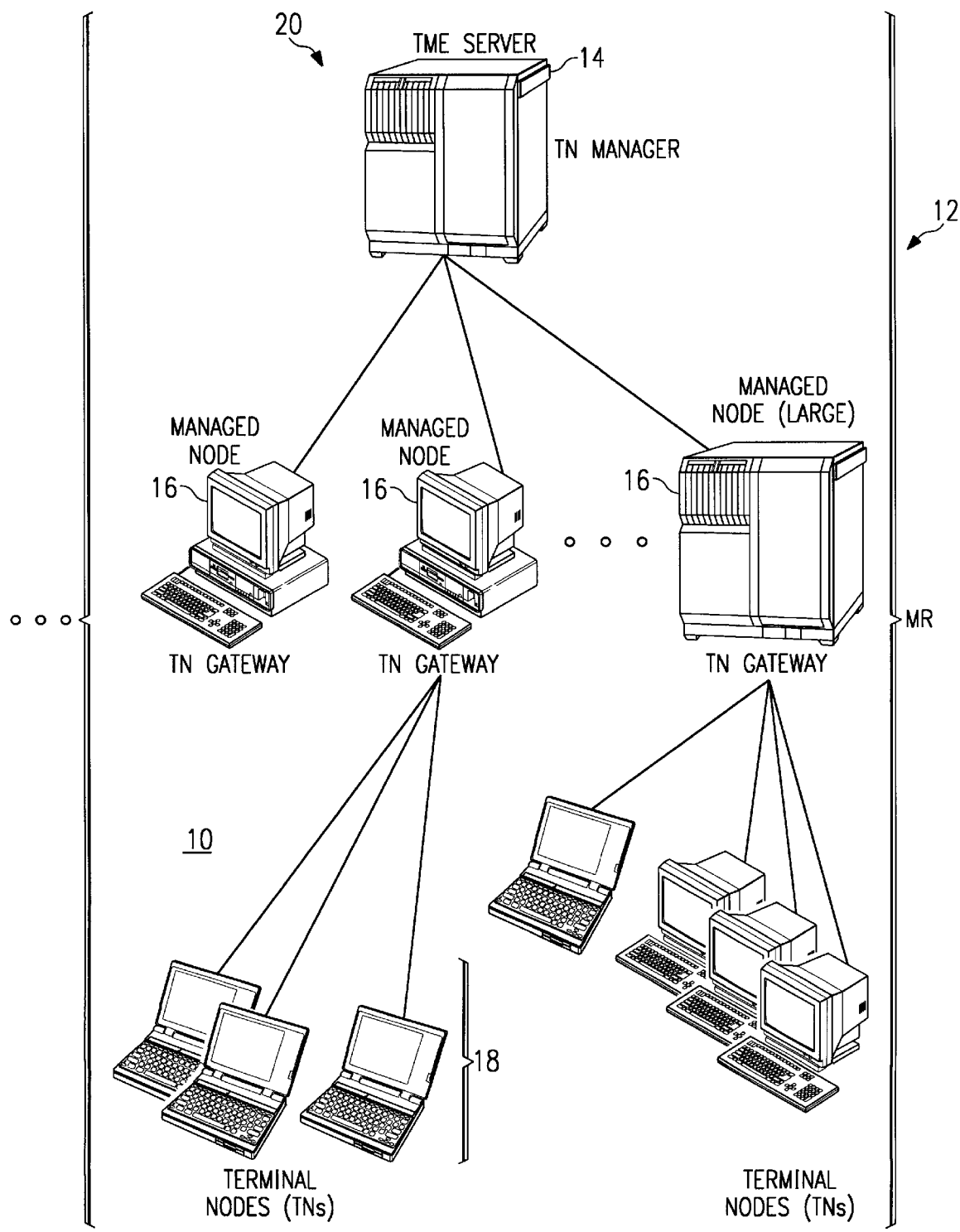
FIG. 1 illustrates a simplified diagram showing a large distributed computing enterprise environment in which the present invention is implemented.

Referring now to FIG. 1, the invention is designed to create configuration management applications for use in a large distributed computer environment 10 comprising up to thousands or even tens of thousands of "nodes." Although this is the preferred application development environment, the teachings of the invention have broader applicability with respect to general application prototyping development, notably where the application to be prototyped includes an associated database of records whose information is used to drive the application.

For convenience, the following background information is provided to explain the basic features of the distributed computing environment. In particular, the nodes of the environment 10 will typically be geographically dispersed and the overall environment is "managed" in a distributed manner. Preferably, the managed environment (ME) is logically broken down into a series of loosely-connected managed regions (MR) 12, each with its own management server 14 for managing local resources with the MR. The network typically will include other servers (not shown) for carrying out other distributed network functions. These include name servers, security servers, file servers, time servers and the like. Multiple servers 14 coordinate activities across the enterprise and permit remote site management and operation. Each server 14 serves a number of gateway machines 16, each of which in turn support a plurality of "endpoints" 18. An endpoint may be a system, a computer, or an application within a system or computer. An endpoint is both the source and destination of configuration data. The server 14 coordinates all activity within the MR using a terminal node manager 20.

Figure 2:
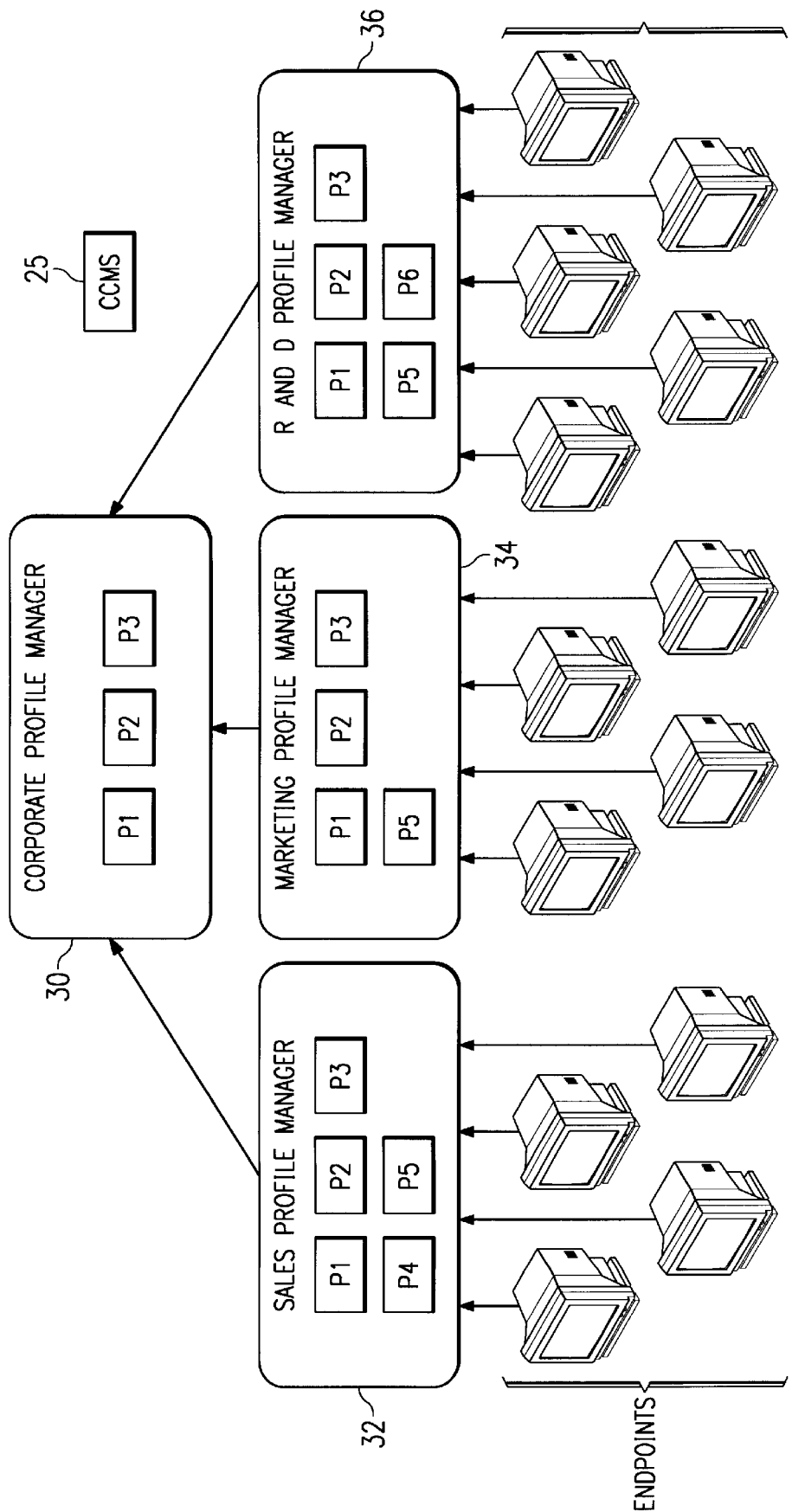
FIG. 2 is a block diagram illustrating a hierarchy of profile managers in a corporate enterprise environment.

Preferably, the environment 10 incorporates a configuration change management system (CCMS) 25, which includes a set of objects and data structures used by so-called "profiles" and by the endpoints. The configuration change management system enables administrators to perform distributed configuration management tasks. CCMS is a set of inherited objects and library calls that provides the base methods for endpoint objects. It is extended herein to provide so-called profile "applications" as will be described below. Such applications are used to control and manage profiles that describe a certain capability or setup that is to be managed across the environment, preferably in a centralized manner. For example, a profile may be established for managing user accounts in an engineering group, for managing the printer configurations in a particular location, for monitoring activities for particular servers associated with a workgroup, etc. Preferably, profile managers subscribe to one or more profiles, and endpoints subscribe to one or more profile managers. This is illustrated in FIG. 2.

As seen in this figure, the enterprise includes a top-level corporate profile manager 30 containing three application configuration profiles P1, P2 and P3. Various profile managers at the workgroup level are defined, including a sales profile manager 32, a marketing profile manager 34 and an R&D profile manager 36. Each workgroup profile manager subscribes to the profile configurations contained at the corporate level. Within the workgroups, those entries in the configurations that are not fixed by the policy established in the corporate profile manager may be overridden as necessary. Additionally, workgroup-specific configuration profiles (such as P4 and P5 in profile manager 32) may be defined. A set of profile endpoints subscribed to the workgroup profile managers perform several tasks. They receive information and actions described in the profile configurations and update system files. They change configurations, and they augment system operations as directed by the system configurations. An administrator is then able to change one item at the corporate profile manager level and affect all machines by merely pressing one button.

FIG. 3 illustrates the relationship between a profile and subscribing endpoint objects in a more general fashion. In this paradigm, a given profile PRO has a profile database PD and a prototype data file PDF associated therewith. The prototype data file PDF is sometimes referred to herein as an application prototyping data file as the information in this file is used to created a prototype application. One or more endpoint objects EP subscribe to the profile PF, and each such endpoint has associated therewith a set of endpoint data ED. The set of endpoint data is preferably the actual data to be managed by the application under development. As will be seen, the profile database PD includes records that contain configuration information that may be applied to an endpoint object or that may be altered as a result of some operation that takes place at the endpoint object. The records are derived initially from the application prototyping data in the PDF. Preferably, the application prototyping data has a consistent, generic format irrespective of the differences between the various machines and systems used throughout the enterprise environment. According to the invention, the builder generates a so-called "prototype application" that is a combination of a profile object and list programmable endpoint code. The prototype application is highly functional and is provided to potential users as early as possible in the development cycle so that application features, interface and performance can be tested, evaluated and refined. Such testing and evaluation is effected using the set of endpoint data from the actual endpoint to be managed by the finished application. When changes to the prototype are necessary, they are effected by modifying the application prototyping data in the PDF.

The application prototyping data structure is now described. Preferably, the input data file is an ASCII file, with comments indicated by lines starting with an # character. Any lines which not comments and not valid are ignored. The file includes a number of keywords including DATAFILE:<value>, DATAMAP:<value>, APP_RC:<value>, ATTR:<value>, KEY_ATTR<value>, and SYNTAX:<value>. The DATAFILE keyword specifies the default file(s) used by the application as the source of input data. There are a number of ways to override this value during application development, and this value can be changed on a per-profile-instance basis. This value is used if no other specification (via APP_RC data or command line switch) for data file is given. The <value> is expected to be a fully-qualified filename. DATAFILE is optional, but highly recommended. Without DATAFILE, an APP_RC file is required.

The DATAMAP keyword is an NIS equivalent for DATAFILE. It can also be overridden by the APP_RC data, but not by command-line switch. The <value> is expected to be a NIS map name, and is optional. The APP_RC keyword specifies a relative filename for a file that contains application override or control information. The value of APP_RC can be changed on a per-profile-instance basis. If the file defined by APP_RC exists, it is processed by the profile at start-up time and the contents of the file can cause the application behavior to be modified.

The ATTR keyword specifies an attribute in the profile. The ATTR keywords are processed in order, and the order is significant. In particular, the CLI (command-line interface) command which prints profile data records displays the attributes in the order specified in this data file. At least one ATTR keyword is required. The value of the ATTR keyword is as follows:

ATTR:<name>:<cli-dpy-hint>:<cli-width>:<gui-dpy-hint>:<gui-width>:<catalog>:<cat-key>:<data-type>:<def-pol-giv en>:<val-pol-given>, where name=attribute name (which should be as short as possible cli-dpy-hint=(1 for visible, 0 for not visible, −1 for never visible)

cli-width=(# of spaces allocated for this attribute in CLI output)

gui-dpy-hint=(1 for visible, 0 for not visible, −1 for never visible)

gui-width=(# of spaces allocated for this attribute in GUI table)

catalog=(TMP message catalog name for attribute's friendly name)

data-type=(0—unknown, 1—string, 2—integer, 3—boolean, 4—stringlist, 5—float).

The KEY_ATTR is an optional keyword that specifies which attributes will comprise the record key. If KEY_ATTR is not defined, then a random (e.g., tmpname(2)) will be used, which makes many profile operations unpredictable. The value of KEY_ATTR is a comma-separated list of attribute names defined by the ATTR keywords. If more than one attribute name is given, then the record key becomes a concatenated string of all the attribute values, each separated by a hyphen. The SYNTAX keyword allows a single Perl regular expression to define a valid syntax for a given attribute. The value of this optional keyword is:

SYNTAX: <attribute-name><:perl-regexp> where any record added/modified will have the attribute specified by <attribute-name> checked to ensure it matches the Perl regular expression <perl-regexp). If the attribute does not match the regexp, then the add/modify operation fails.

The prototype also requires some parsing information so that it can parse the data in the datafile and load that data into CCMS data structures:

PARSE:<value1-A>

PARSE:<Value1-B>

The PARSE keyword always comes in pairs. The first member of the pair is a regular expression with parenthetic indication of attribute data. The second member of the pair is a comma-separated list of attributes which correspond (in positional order) to the parenthesis indicators in the previous expression. The PARSE pairs are evaluated in the order given in the file against logical records from the application data file.

FIGS. 4 and 5 provide sample application prototyping data files that parse the UNIX/etc/passwd file and that parse the UNIX/etc/hosts file, respectively. How such files are used to facilitate the generation of a prototype application is now described. Lines 1 and 12–13 in FIG. 4 reflect the minimum amount of data that the profile PRO passes to the EP object in the prototyping phase so that the EP object exhibits some behavior. List programmable endpoint code in the builder takes the information in these lines and loads the information in an array, which is then used by the endpoint object for reading and writing ED as will be seen.

Figure 6:
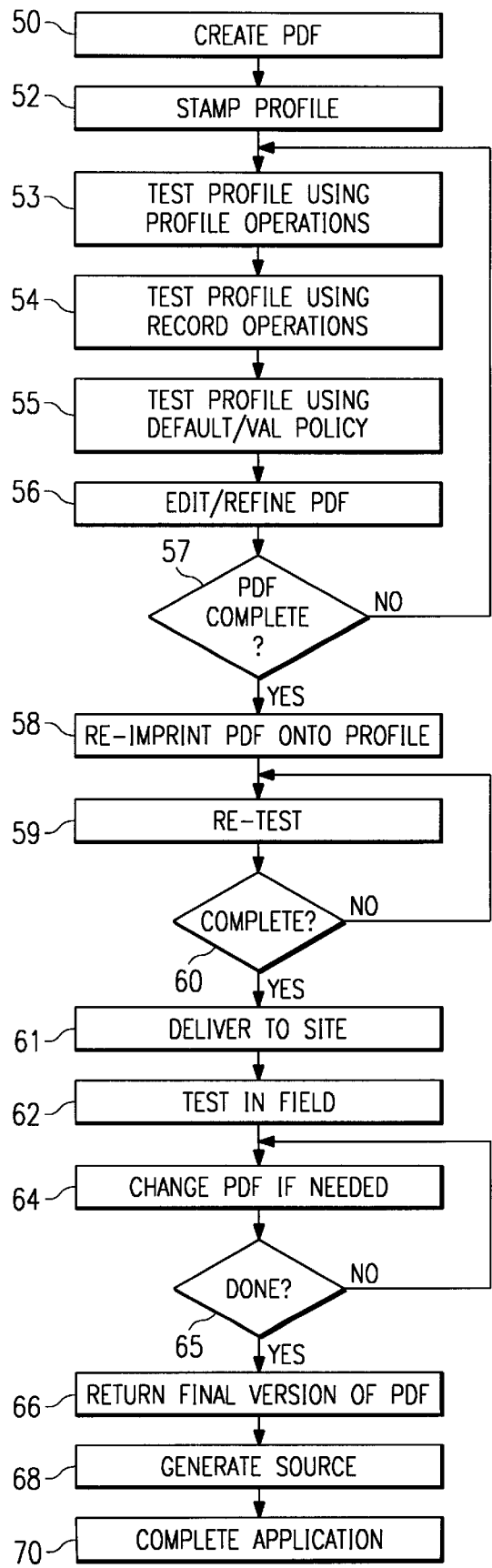
FIG. 6 is a flowchart showing the preferred method of developing a configuration management application according to the present invention.

A preferred method of developing a configuration application is illustrated in the flowchart of FIG. 6. The purpose of the application is to manage endpoint configuration data, which is the ED as illustrated in FIG. 3. All of the steps of FIG. 6 with the exception of the last one preferably constitute a "prototyping" phase. In the prototyping phase, the Profile (PRO), the Profile Database (PD) and the one or more endpoint objects (EP's) are part of the builder "runtime." Each data set (ED) as discussed above is the actual configuration data (for the endpoint) sought to be managed by the application under development. In the prototyping phase, each actual endpoint to be managed (e.g., one or more endpoints designated by reference numeral 18 in FIG. 1) may have a different set of endpoint data and an associated endpoint object representing the endpoint. As will be seen, a set of endpoint data is supplied to the prototype application during the prototype phase to enable the application developer to validate the profile and endpoint objects and thus the application prototyping data that will be used to generate the finished application.

The method begins at step 50 with the application developer creating the initial PDF, the file of application prototyping data having the format as described above and illustrated in FIGS. 4–5. As discussed, this file is preferably an ASCII text file that describes the relevant attributes for each record in a configuration database. The file also specifies what the keyword value is for each record, and it includes appropriate control instructions that tell the endpoint how to parse the file and rewrite it to construct individual records. At step 52, the application prototyping data is imprinted or stamped onto the profile PRO, which upon initialization of the builder is essentially "blank." In other words, a blank profile is one whose database PD has null-valued configuration records. At step 53, the application developer tests the profile (with the one or more endpoint objects) using basic profile operations, which include one or more of the following operations: Populate, Preview, Distribute and Synchronize. Populate loads data from ED into PD, with any conflicts resolved in favor of PD. Distribute sends data from PD to EP, causing ED to reflect the contents of PD. Preview sends data from PD to EP, showing user differences between PD and ED (with changes not made, however). Synchronize loads data from ED to PD, with conflicts resolved in favor of ED.

Referring back to FIG. 6, the application prototyping method continues at step 54 with the application developer testing the profile record operations (with the endpoint objects) which include one or more of the following: Add, Modify or Delete. Add loads a record into the PD; Modify modifies an existing record; Delete deletes and existing record. At step 55, the application developer continues to test a Default/Validation policy.

As a result of one or more of the tests at steps 53–55, which steps may be carried out in any order, the application developer then edits or refines the PDF. This is step 56 in FIG. 6. The resulting PDF is then re-tested in accordance with the operations set forth at steps 53–55. When the PDF is complete, the output of the inquiry at step 57 is positive, at which point the PDF is re-imprinted onto the profile PRO at step 58. At step 59, the profile is tested yet again as may be needed to ensure that it is ready for field testing. When the profile is ready, as indicated by a positive output of the inquiry at step 60, the builder and the final PDF are taken to a site at step 61 for prototype field testing. At step 62, the basic profile, record and/or policy operations are carried out (as in steps 53–55) are repeated as necessary, and any necessary changes to the PDF are made at step 64. When the profile has been fully field-tested, as indicated positive output of the inquiry at step 65, the final version of PDF is returned from the site at step 66. At step 68, the final version of PDF is used to generate application source code, comprising the profile application and the list programmable endpoint code. At step 70, the application developer takes the generated source code and completes the application with any user-specific requirements.

Some of the steps shown in FIG. 6 are now illustrated in more detail with respect to a particular PDF and a sample endpoint data file. For convenience, it is assumed that the PDF is the file shown in FIG. 4. The sample endpoint data file for etc/passwd is assumed to be as follows:

1:root:OqayqUEu1uL.0:3::/:/sbin/sh
2:bin:*:2:2::/usr/bin:/sbin/sh
3:adm:*:4:4::/var/adm:/sbin/sh
4:lp:*:9:7::/var/spool/1p:/sbin/sh
5: notes:150:30:Notes Administrator: /extra/notes:/bin/sh FIG. 7 illustrates the Endpoint Data (ED) configured using the PDF (of FIG. 4) and the sample endpoint data file above. FIG. 8 illustrates a blank Profile Database PD prior to a profile operation involving the ED of FIG. 7. In particular, assume that the user performs a Populate operation. As noted above, ED stays the same, but PD is changed as shown in FIG. 9. Now, assume the user does an Add record operation and a Change record operation (on 'bin'). The resulting Profile Database PD is shown in FIG. 10. Next, assume the user does a Preview operation. As noted above, Preview does not change either PD or ED, but the endpoint object EP will return the following given the Add and Change record operations performed by the user:

ADD: Record 'bob'
CHANGE: Record 'bin', attribute shell changed: /sbin/sh (/sbin/csh Assume now that the user performs a Distribute operation. PD stays the same, but ED changes as shown in FIG. 11. Assume now that an administrator on the EP manually modifies the data in ED, adding a new record and changing the shell of entry 'bin' back to /sbin/sh. The resulting ED is illustrated in FIG. 12. Finally, assume that the user does a Synchronize operation. ED stays the same, but PD changes, as illustrated in FIG. 13. As seen in this figure, the 'jane' record is added, and the 'bin' record is changed to look like the ED version.

Thus, during the Populate operation initiated by PRO, EP reads ED, converts it to a common structure, and returns records to PRO. PRO loads the new records into PD, with conflicting records ignored. During a Distribute operation, PRO sends all PD records to EP, EP converts the records from the common structure to ED structure, and the EP stores changes into ED. In Preview, PRO sends all PD records to EP, and EP converts records from the common structure to ED structure. EP then compares PD records to ED records and returns the differences. In a Synchronize operation initiated by PRO, EP reads ED, converts it to the common structure and returns records to PRO. PRO then loads the new records into PD, and any conflicting records are overwritten in PD.

To scale to potentially large data sets, Populate breaks the data into blocks, where the block-size is controlled on a per-profile basis. The Populate operation reads the data from the endpoint in blocks, and each block is saved to CCMS in a separate top-level transaction. The Populate command has the following CLI syntax (with all options available from the GUI as well):

wpopprf {-m][-c source|profile][-m][-f datafile][-d][-a attr] [-v][-x][-R|S] Source Profile [rec . . . ], where
-c specifies which record will prevail in the case of a record conflict (two records with identical keys). The default is profile.
-m causes conflict records to be merged rather than replaced. A merged record contains the intersection of all attributes present in both records, with the primary record's attributes retained in the case of attribute conflicts.
-d causes default policy to be run on each record added during Populate.
-a attr specifies which attribute to use for comparison when populating only a subset of records. The default is the record key.
-A causes the populated records to have associated AEF actions assigned.
-v causes all differences between the endpoint and the profile to be displayed.
-x is the same as -v, but records which are only in the profile are omitted.
-R indicates that the specified keys to be populated are to be treated as perl regular expressions.
-S indicates that the specified keys to be populated are to be treated as substrings.
rec . . . specifies which records to populate from the endpoint. The default is all records.

As already noted, the Synchronize operation is a special case of Populate, where the data on the endpoint is loaded into the profile, and any conflicting records are resolved with the endpoint's version having precedence. It is the equivalent of using the "-c source" option for wpoppprf. The Verify operation is a special case of Synchronize, where the endpoint data is simply compared to the profile, with differences reported back to the user (see the -x and -v options).

As also noted, Distribute is the process of causing the endpoint configuration to mirror the profile. Preview is the special case of Distribute, where the changes which would be made to the endpoint are reported back to the user (but not made). In the preferred embodiment, endpoint actions are application-specific operations that occur as the result of a Distribute operation. These actions may occur as each distributed data record is processed, or in a batch operation at the end of the distribution. Endpoint actions are not triggered as a result of a Preview operation.

The Distribute command has the following CLI syntax (all options are available from the GUI as well):

wdistpprf [-p|-r] [-m] [-l maintain|over_opts|over_all] Profile[Subscriber . . . ], where -p means preview the distribute operation, but do not make changes on the endpoint. If this option is specified one (and only one) Subscriber (which is an endpoint) must also be specified. Preview can only compare a profile to a single endpoint. Note that this operation only compares records which would be distributed to the endpoint, showing add/modify/delete information.

-r means show which records would be distributed, but do not distribute anything.

-m means push all the way to the endpoints. The default is to push one level only in the management hierarchy.

-p mode compares the given profile to the given endpoint with all intermediate profiles ignored.

The Record Editing functions include Add, Modify, Delete, Touch, Copy and Move. The Add function adds a single record (by CLI or GUI) to a profile. Preferably, more than one record may be added via a Populate operation. Modify can operate on more than one record at a time, but can only change one attribute at a time. Modify changes a single attribute on one or more records to a new value or a modified version of an existing value (through a regexp substitution). Delete operates on one or more records, and it simply marks the record as deleted. Copy can operate on one or more records, and it causes an exact copy of the source records to be created in the destination profile. Because the goal of Copy is to make records an exact copy, default policy is not run at the destination. Move can operate on one or more records, and it causes the record(s) to be deleted from the source profile and created in the destination profile. Again, since the goal of Move is to simply transfer the record from one profile to another, default policy is not run at the destination. Touch causes a timestamp on a given record to marked as current. Touch can operate on one or more records, and it will cause those records to be distributed at the next profile distribution.

According to the invention, the EP object works with a large number of data file formats during prototyping because of the PDF. In particular, the PDF DATA_FILE and PARSE keywords are stored on the PRO (preferably not in the PD), and are passed to the EP during the Populate/Preview/Distribute/Synchronize operations. This control gives a great deal of flexibility to the application designer during the testing of the prototype.

For example, if the prototype normally uses the /etc/passwd file of FIG. 4 (which controls who can log into the system), the PDF DATA_FILE keyword could be changed to use /etc/passwd.copy (and the original passwd file copied to /etc/pass.wd.copy), which would allow the prototype to test without risk of corrupting the live system file. As another example, assume one customer has several users which share a common login and UID, but the UID's are distinguished by the gcos field, which this customer uses to store a social security number of the user. The existing KEY_ATTR value would not be adequate for this customer since they may have several records that have the same login/uid values, but are different in the gcos attribute. Simply changing: KEY_ATTR:login, uid, gcos will fix the prototype for this customer and alert the application developer that a key change (critical in database problems) is needed.

The PDF is preferably stored (imprinted) on the PRO, and the PARSE/DATA_FILE values are passed down to the EP during normal operations. The EP (when in prototype mode) can read/write the ED by using the values passed in from the PARSE keywords in the EP. If the prototype cannot correctly translate from ED to data records (e.g. a Populate operation does not load all the records defined in the ED), the PARSE keywords can be modified in EPT and the PRO re-imprinted.

The EP DATA_FILE keyword can be split into an Input data file (the file used during Populate/Synchronize), which is used when data is flowing from EP to PRO, and an Output data file (used during Distribute/Preview), which is used when data is flowing from PRO to EP. This allows the application developer to perform looping tests on the application to verify the robustness of the EP code. This is a particularly advantageous aspect of application testing as the ED file is often how the end-user judges that the application works correctly. The ED file is also likely to be at least partially corrupt it may be modified by hand in a way that results in "garbage" entries.

Preferably, the builder operates in an object-oriented paradigm. The builder runtime generates the profile object and the one or more endpoint objects. The builder includes a set of standard object types that together constitute a general object architecture. These standard object types are closely interrelated and are used to build objects for the profile and endpoint objects and thus, for the applications. The objects may be divided into one or more object types that may be managed by instance managers. An object type is a set of objects that share a common interface. Each object of the same type is called an instance of the type.

Thus, according to the present invention, the builder takes a given data set (of application prototyping data) and produces a prototype application. The input data required to generate a prototype is given to the builder in an ASCII data file, and the syntax of that file has a predetermined format so that different application developers may use the builder irrespective of the type of endpoints they are designing for. The application prototyping data can be refined based on feedback from the prototype until the prototype is considered acceptable. The nature and content of the feedback will depend on the outcome of various profile record tests carried out on the prototype application using a plurality of user operation commands. Once the final application prototyping data is determined, the builder is then used to generate application source for a profile application. At this point, the application developer transforms the source into a working configuration management application.

As noted above, preferably the prototype application and the profile application include skeletal endpoint code. Although not meant to be limiting, this endpoint code may include: extended IDL (a CORBA interface definition language) for profile method specifications, library code for driving the graphical user interface (GUI), C code for method implementations, and makefiles to build the application using a standard managed environment. In particular, the builder is preferably designed to provide some amount of utility code via a set of libraries to thereby reduce development time. Preferably, these libraries are statically linked with an application and can therefore have specific functions redefined in the application source (thus causing the linker to not use the library implementation). This behavior is predictable across all architectures since the utility libraries are statically linked with the method executables. Some of the methods are provided in source format so that the application developer may complete the implementation. Preferably, the builder will provide a sample implementation of all methods which are not provided via object inheritance, with the sample containing comments directing the developer to areas that are required to be coded. For this type of implementation, the developer is free to use/discard as much of the source implementation as desired. Since the output of the builder includes C source code, the application developer may customize that source to meet any special requirements of a particular application.

In the preferred embodiment, the builder develops so-called "regular" profile applications. A regular profile application is one for which the data being managed (as opposed to the application prototyping data) is tabular in nature. For such an application, both the methods of the application-specific profile that are not inherited and the GUI code for the profile can be automated easily. Under CCMS, the profile itself does not typically manipulate external files or system resources, as this is done at distribution time by the application endpoint. Most of the application-specific methods of a profile are those that update and retrieve records from the CCMS database.

The GUI for a profile is preferably standardized and includes a basic table view, add and edit record dialog screens, standard Distribute and Populate dialog screens, and edit default and validation policy dialog screens. As noted above, the builder preferably includes a library of library glue code that is written to be as generic as possible. A small amount of this code is generated as part of each prototype or profile application that is built using the builder. The application-specific code is linked with the generic library to build a completely functioning GUI process for the new application.

The builder provides significant advantages and benefits. It enables much quicker development time for CCMS applications. It provides more consistency in the development of profile applications. The resulting applications have fewer errors and exhibit better code quality. Using the builder, more of the basic code will be generated or shared, rather than each application having to develop its own version of particular methods and interfaces. As a result, application developers have better productivity and development costs are significantly reduced. The builder is quite advantageous as it enables the developer to quickly prototype an application, and then to focus as much attention as possible to the endpoint implementation, which is the most critical component of a profile application since the endpoint code actually modifies the endpoint configuration. By getting a highly functional prototype before users early, the application's features, interface and performance can be quickly refined.

Preferably, the server and each of the gateways is a computer or "machine." For example, each computer may be a RISC System/6000® (a reduced instruction set or so-called RISC-based workstation) running the AIX (Advanced Interactive Executive) operating system, preferably Version 3.2.5 or greater. The AIX operating system is compatible at the application interface level with the UNIX operating system, version 5.2.

The various models of the RISC-based computers are described in many publications of the IBM Corporation, for example, RISC System/6000, 7073 and 7016 POWERstation and POWERserver Hardware Technical Reference, Order No. SA23-2644-00. The AIX operating system is described in AIX Operating System Technical Reference, published by IBM Corporation, First Edition (November, 1985), and other publications. A detailed description of the design of the UNIX operating system is found in a book by Maurice_J. Bach, *Design of the Unix Operating System*, published by Prentice-Hall (1986). Suitable alternative machines include: an IBM-compatible PC 486 or higher running Novell UnixWare 2.0, an AT&T 3000 series running AT&T UNIX SVR4 MP-RAS Release 2.02 or greater, Data General AViiON series running DG/UX version 5.4R3.00 or greater, an HP9000/700 and 800 series running HP/UX 9.00 through HP/UX 9.05. Motorola 88K series running SVR4 version R40V4.2, a Sun SPARC series running Solaris 2.3 or 2.4, or a Sun SPARC series running SunOS 4.1.2 or 4.1.3. Of course, other machines and/or operating systems may be used as well for the gateway and server machines.

Each endpoint is also a computer. In one preferred embodiment of the invention, most of the endpoints are personal computers (e.g., desktop machines or laptops). In this architecture, the endpoints need not be high powered or complex machines or workstations. One or more of the endpoints may be a notebook computer, such as an IBM ThinkPad® machine, or some other Intel x86 or Pentium®-based computer running Windows 3.1 or greater operating system. IBM® or IBM-compatible machines running under the OS/2® operating system may also be implemented as the endpoints. For more information on the OS/2 operating system, the reader is directed to OS/2 2.0 Technical Library, Programming Guide Volumes 1–3 Version 2.00, Order Nos. 10G6261, 10G6495 and 10G6494.

One of the preferred implementations of the application builder and development tool of the invention is as a set of instructions in a code module resident in the random access memory of the management server. The management server has a processor and an operating system for running the application builder, and associated input/output devices that are conventional in the art. Until required by the computer, the set of instructions may be stored in another computer memory, for example, in a hard disk drive, or in a removable memory such as an optical disk (for eventual use in a CD ROM) or floppy disk (for eventual use in a floppy disk drive), or even downloaded via a network connection. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific network environment, those skilled in the art will recognize that the invention can be practiced, with modification, in other and different application development architectures with the spirit and scope of the appended claims.

Having thus described my invention, what I claim as new and desire to secure by Letters Patent is set forth in the following claims:

1. A method of developing a configuration management application for use in a distributed computing environment having a management server and at least one endpoint, the endpoint having a set of endpoint data to be managed by the application, comprising the steps of:

(a) using application prototyping data to generate a prototype application, the prototype application comprising a profile object and an associated database of records containing configuration information to be applied to an endpoint object representative of the at least one endpoint;

(b) having the endpoint object apply the endpoint data to the database records to thereby evaluate the prototype application; and (c) refining the application prototyping data as necessary based on the evaluation.

2. The method of developing a configuration management application as described in claim 1 further including the step of:

(d) using the refined application prototyping data to generate a profile application comprising a modified profile object.

3. The method of developing a configuration management application as described in claim 2 further including the step of:

(e) using the modified profile object to generate source code for the configuration management application.

4. The method of developing a configuration management application as described in claim 1 wherein the application prototyping data has a predetermined format.

5. The method of developing a configuration management application as described in claim 4 wherein the predetermined format is an ASCII text file having a datafile name, one or more attributes, a keyword, and at least set of parsing expressions.

6. The method of developing a configuration management application as described in claim 5 wherein the endpoint object is controlled to apply the endpoint data by control information which includes the datafile name and the at least one set of parsing expressions.

7. The method of developing a configuration management application as described in claim 1 wherein in step (b) database records are passed to the endpoint object and the endpoint object performs configuration changes to conform the set of endpoint data to the database records.

8. The method of developing a configuration management application as described in claim 1 wherein in step (b) database records are passed to the endpoint object and the endpoint object reports configuration changes necessary to conform the set of endpoint data to the database records.

9. The method of developing a configuration management application as described in claim 1 wherein in step (b) the set of endpoint data is read by the profile object.

10. The method of developing a configuration management application as described in claim 1 wherein in step (b) the database records are changed to conform to the set of endpoint data.

11. A method of developing an application for use in a distributed computing environment having a management server and at least one endpoint, the endpoint having a set of endpoint data to be managed by the application, comprising the steps of:

(a) using application prototyping data to generate a prototype application, the prototype application comprising a profile object and an associated database of records containing configuration information to be applied to an endpoint object representative of at least one endpoint;

(b) passing control information from the profile object to the endpoint object to apply the endpoint data to the database records to thereby evaluate the prototype application;

(c) refining the application prototyping data as necessary based on the evaluation;

(d) using the refined application prototyping data to generate said application comprising a modified profile object.

12. The method of developing an application as described in claim 11 further including the step of generating source code for the application using the modified profile object.

13. The method of developing an application as described in claim 11 wherein the control information adds, modifies or deletes records from the database.

14. A computer program product for developing configuration management applications useful in a distributed computer environment, the computer environment including a management server and at least one endpoint having a set of endpoint data to be managed by the application, comprising:

means for generating a blank profile object and at least one endpoint object representative of the at least one endpoint;

means for imprinting the blank profile object with application prototyping data to generate a prototype application, the prototype application comprising a profile object and an associated database of records containing configuration information to be applied to at least one endpoint object;

means for applying the endpoint data to the database records to thereby evaluate the prototype application; and means for refining the application prototyping data as necessary based on the evaluation.

15. The computer program product as described in claim 14 wherein the means for applying includes:

means for modifying the set of endpoint data to mirror the database records.

16. The computer program product as described in claim 14 wherein the means for applying includes:

means for reporting a set of configuration changes necessary to conform the set of endpoint data to the database records.

17. The computer program product as described in claim 14 wherein the means for applying includes:

means for modifying the database records to reflect a current configuration of the endpoint object as represented by the set of endpoint data.

18. A computer, comprising:

a processor;

an operating system;

application builder means run by the processor and the operating system for generating a prototype application executable in a distributed computer environment having a management server and at least one endpoint, the endpoint having a set of endpoint data to be managed, the application builder means comprising:

means for generating a blank profile object and at least one endpoint object representative of the at least one endpoint;

means for imprinting the blank profile object with application prototyping data to generate the prototype application, the prototype application comprising a profile object and an associated database of records containing configuration information to be applied to at least one endpoint object;

means for applying the endpoint data to the database records to thereby evaluate the prototype application; and means for refining the application prototyping data as necessary based on the evaluation.

19. The computer as described in claim 18 wherein the means for applying the application builder means includes:

means for selectively (a) modifying the set of endpoint data to mirror the database records, (b) reporting a set of configuration changes necessary to conform the set of endpoint data to the database records, (c) reading the set of endpoint data, and (c) modifying the database records to reflect a current configuration of the endpoint object as represented by the set of endpoint data.

* * * * *

UNITED STATES PATENT AND TRADEMARK OFFICE
CERTIFICATE OF CORRECTION

PATENT NO.    : 5,996,012
DATED         : November 30, 1999
INVENTOR(S)   : Stuart L. Jarriel It is certified that error appears in the above-identified patent and that said Letters Patent is hereby corrected as shown below:

Claim 19,
Line 63, delete "(c)" and substitute --(d)--.

Signed and Sealed this

Seventeenth Day of July, 2001

Attest:

NICHOLAS P. GODICI
Attesting Officer     Acting Director of the United States Patent and Trademark Office